United States Patent Office 2,768,212
Patented Oct. 23, 1956

2,768,212

ADDITION OF ACETALS AND KETALS TO OLEFINS

John W. Copenhaver, Short Hills, N. J., assignor to General Aniline & Film Corporation, New York, N. Y., a corporation of Delaware No Drawing. Application June 29, 1951,
Serial No. 234,445

8 Claims. (Cl. 260—611)

This invention relates to a method of preparing diethers of glycols in which the hydroxyl groups are attached to two consecutive alternate carbon atoms in a carbon chain, and derivatives thereof, and to the products produced thereby.

The reaction of aldehydes or substances capable of generating aldehydes, with olefins, is an old reaction. Prins (Chem. Centr. I, 420 [1920]; C. A. 14, 1662 [1920]) reacted styrene and formaldehyde in acetic acid solution to give the acetate of phenyltrimethylene glycol and phenyl-1,3-dioxane. This reaction has also been studied more recently by Emerson (J. Org. Chem. 10, 464). Rosen and Arundals ( U. S. 2,368,494) describe the reaction of aldehydes or substances capable of decomposing to give aldehydes with tertiary olefins to give meta-dioxanes, as does Loder (U. S. 2,158,031).

Contrary to the teachings of the above-cited art, I have found that the addition of a formal, acetal, ketal, or sulfur analog thereof, to a hydrocarbon containing an activated ethylenically unsaturated group, in the presence of an acid-reacting catalyst under substantially anhydrous conditions, gives high yields of diethers of the above-described glycols. The reaction may be formulated as follows:

$$R^1C\begin{matrix}R^2QR^3\\ \\QR^4\end{matrix} >C=C< \longrightarrow \begin{matrix}R^1\\ \\ \\R^2\end{matrix}C-\begin{matrix}\\ \\QR^3\end{matrix}C-QR^4$$

in which Q is a chalcogen of atomic weight less than 33, i. e., oxygen or sulfur, $R^1$ and $R^2$ may be hydrogen or hydrocarbon, e. g., alkyl, aralkyl, cycloalkyl or aryl, or may together form a carbocyclic ring, and $R^3$ and $R^4$ may be radicals of an alcohol, preferably a lower aliphatic alcohol. It will be noted that this reaction involves a splitting of one of the ether groups from the acetal and migration of the resulting radicals of the acetal to saturate the ethylenic compound thereby producing the desired diether. The corresponding alternating -ether-ene may be produced therefrom by dealcoholization.

In the following general description of the invention, the term acetal is employed to denote generally the operative formals, acetals and ketals and sulfur analogs thereof, while the term activated olefin is employed to denote the operative hydrocarbons containing an activated ethylenically unsaturated group.

The reaction of an acetal with an activated olefin may be carried into effect by adding the requisite amount of catalyst to the acetal and then carefully adding the activated olefin. The reaction is usually very mildly exothermic and is very easily controlled. The catalyst may then be neutralized with a suitable base, and the reaction product isolated, generally by distillation.

The following examples present specific embodiments of the invention, although it is to be understood that the invention is not to be limited thereby.

*Example 1.*—Preparation of 1,3-dimethoxy-1-phenyl propane

⟨phenyl⟩—CH=CH$_2$ + H$_2$C(OCH$_3$)$_2$ ⟶

⟨phenyl⟩—CHCH$_2$CH$_2$OCH$_3$
               |
               OCH$_3$ 532 g. (7 moles of dimethyl formal and 17.5 ml. (2.5 ml./mole of formal) boron fluoride etherate were charged to a 2-liter 3-necked flask fitted with a sealed motor driven stirrer, dropping funnel, reflux condenser, and thermometer and 520 g. (5 moles) of freshly distilled styrene added dropwise during 2.5 hours. The reaction was very mildly exothermic; the reaction temperature rising from 27 to 31° C. during the first hour, from 31 to 36° C. during the second hour and from 36 to 37° C. during the next half hour. The reaction mixture was stirred 2.5 hours longer, let stand overnight and then warmed to 70–80° C. for 5.5 hours. The catalyst was neutralized with ethanolamine, the supernatant liquid decanted from the oily insoluble layer and distilled to give 174 g. unreacted dimethyl formal, B. P. 41–42° C., 42 g. B. P. 35–98° C./12 mm. mainly unreacted styrene, 544 g. of 1,3-dimethoxy-1-phenylpropane, B. P. 106° C./14 mm., 15 g. of an intermediate fraction, 112 g. B. P. 172° C./4 mm. and 28 g. residue, non-distillable at 4 mm. pressure and 260° C. pot temperature.

The 1,3-dimethoxy-1-phenyl propane had $N_D^{25}$ 1.4870, $d_4^{25}$ 0.9760, and was characterized by analysis.

Calc. for $C_{11}H_{16}O_2$: C, 73.3; H, 8.95. Found: C, 73.41; H, 8.96.

The yield of this product was 60 percent based on styrene charged with no allowance for recovered styrene.

The product boiling at 172° C./4mm. is presumably the adduct of 2 moles of styrene and 1 mole of formal as indicated by the analysis. Calc. for $C_{19}H_{24}O_2$: C, 80.26; H, 8.51. Found: C, 81.23; H, 8.46. No evidence is available as to its structure.

A similar reaction between styrene and other formals and acetals gave the following results.

Example 2

Dimethyl acetal (3 moles), styrene (1.0 mole), 15 ml. boron fluoride etherate gave 34 g. of 1,3-dimethoxy-1-phenyl butane. B. P. 115–117° C./18 mm. $N_D^{25}$ 1.4790. $D_4^{25}$ 0.9531. $M_D$ (Calc.) 57.31; Found 57.80.

*Analysis.*—Calc.: C, 74.19; H, 9.34. Found: C, 74.12; H, 9.44.

Example 3

Methyl Carbitol formal (CH$_2$(OCH$_2$CH$_2$OCH$_2$CH$_2$OCH$_3$)$_2$)

(2.63 moles), styrene (2.0 moles) and 7.8 ml. boron fluoride etherate gave 145 g. of 1,3-di-methoxyethoxy ethyl ether of 1-phenyl propane diol-1,3. B. P. 173–178° C./0.01 mm., $N_D^{25}$ 1.4833.

*Analysis.*—Calc.: C, 64.02; H, 9.05. Found: C, 64.13; H, 8.89..

Example 4

Methyl Cellosolve formal (CH$_2$(OCH$_2$CH$_2$OCH$_3$)$_2$) (2.8 moles), styrene (2.8 moles) and boron fluoride etherate (8.4 ml.) gave 241 g. of the dimethoxyethyl ether of 1-phenyl propane diol-1,3, B. P. 147–152° C./3 mm., $N_D^{25}$ 1.4827.

*Analysis.*—Theory: C, 67.13; H, 9.01. Found: C, 68.16; H, 8.77.

Example 5

Dimethyl benzal (⟨phenyl⟩—CH(OCH$_3$)$_2$)

(4.0 moles), syrene (2.5 moles) and boron fluoride etherate (12 ml.) gave 571 g. of 1,3-dimethoxy-1,3-diphenyl propane, B. P. 150–151° C./3mm., M. P. 58° C. after recrystallization.

*Analysis.*—Theory: C, 79.65; H, 7.86. Found: C, 79.51; H, 7.67.

Example 6

Dibutyl benzal (2.42 mole), styrene (1.8 moles) and boron fluoride etherate (7.2 ml.) gave 176 g. 1,3-dibutoxy-1,3-diphenyl propane, B. P. 135–155° C./0.01 mm., $N_D^{25}$ 1.5132.

*Analysis.*—Theory: C, 83.73; H, 9.07. Found C, 83.04; H, 8.83.

Example 7.—Preparation of 1,3-dithioethyl-1-phenyl butane $$CH_3CH(SC_2H_5)_2 + \text{C}_6\text{H}_5-CH=CH_2 \longrightarrow \text{C}_6\text{H}_5-CHCH_2CHCH_3 \text{ with } SC_2H_5, H_5C_2S$$

150 g. (1 mole) diethyl mercaptal and 3 ml. boron fluoride etherate were charged to a 500 ml. flask fitted with the usual accessories and 90 g. (1 mole) of freshly distilled styrene added. The reaction mixture was heated at 50° C. for several hours, cooled, the catalyst neutralized and the reaction mixture distilled to give in addition to some unreacted styrene and mercaptal 50 g. of 1,3-dithioethyl-1-phenyl butane B. P. 143–148° C./3 mm., $N_D^{25}$ 1.5460.

*Analysis.*—Calc. for $C_{14}H_{22}S_2$: C, 66.09; H, 8.72; S, 25.20. Found: C, 66.13; H, 8.64; S, 25.38.

Example 8.—Preparation of 2,4-dimethoxy-2-methyl pentane $$CH_3CH(OCH_3)_2 + CH_2=C(CH_3)_2 \longrightarrow CH_3CH-CH_2-C-OCH_3 \text{ with } OCH_3, CH_3$$

451 g. (5 moles) dimethyl acetal and 10 ml. boron fluoride etherate were charged to a 1-liter, 3-necked flask fitted with a sealed stirrer, thermometer, reflux condenser and gas inlet tube and connected to a dry ice-methanol cooled trap. The reaction mixture was cooled to 3° C. and 169 g. isobutylene passed in from a cylinder during 3.5 hours while allowing the temperature to increase slowly to 15° C. The reaction mixture was allowed to stand overnight and then warmed to 40–50° C. to distill out unreacted isobutylene. The catalyst was neutralized with 10 ml. of ethanolamine and the supernatant liquid decanted from the insoluble, oily layer. Distillation through a packed column gave unreacted acetal and then 110 g. of 2,4-dimethoxy-2-methyl pentane, B. P. 145–150° C., $N_D^{25}$ 1.4070, $d_4^{25}$ 9.8635.

*Analysis.*—Calc. for $C_8H_{18}O_2$: C, 65.53; H, 12.37. Found: C, 65.35; H, 12.62.

Example 9

Using 245 g. dimethyl benzal, 6.5 ml. boron fluoride and isobutylene under 15 pounds pressure at 25° C., there was obtained a 49.7% yield based on reacted benzal of the expected reaction product, 2-methyl-4-phenyl-2,4-dimethoxybutane boiling at 104° C./6 mm., $N_D^{25}$ 1.4852.

*Analysis.*—Calc. for $C_{13}H_{20}O_2$: C, 74.95; H, 9.68. Found: C, 74.75; H, 9.67.

Example 10

104 g. (1.9 moles) isobutylene passed into 304 g. (4 moles) dimethyl formal and 16 ml. boron fluoride etherate at −5 to 0° C. gave 54 g. of 2,4-dimethoxy-2-methyl butane, boiling at 141° C., $N_D^{25}$ 1.4057.

*Analysis.*—Calc. for $C_7H_{16}O_2$: C, 63.59; H, 12.21; methoxyl, 46.95%. Found: C, 63.67; H, 12.41; methoxyl, 46.67%.

Example 11.—Preparation of 2,4-dimethoxy-2-methyl pentane 270 g. (3 moles) dimethyl acetal were cooled to 0° C. in the same apparatus as in Example 8 and 12 ml. stannic chloride added.

86.1 g. (1.55 moles) isobutylene were passed into the reaction mixture while maintaining the temperature at 0–5° C. for 5 hours and then allowed to warm up gradually to room temperature. After standing at room temperature for 72 hours, the catalyst was neutralized with diethanolamine and the neutralized reaction mixture distilled to give 58 g. of 2,4-dimethoxy-2-methyl pentane, B. P. 63–65° C./40 mm., $N_D^{25}$ 1.4072.

Example 12

Carried out as above except using 4 g. gallium trichloride per mole of acetal. Yield of product only 4.3 percent.

Example 13

As above, using about 2.67 mls. boron fluoride dihydrate ($BF_3 \cdot 2H_2O$). Yield of product 1.5%.

The following examples illustrate the general addition reaction hereinbefore described, combined with a concurrent dealcoholization to produce the corresponding -etherene in which the ethylenically unsaturated group in the chain is separated by one carbon atom from the carbon atom to which the ether group is attached.

Example 14.—Reaction of dimethyl benzal with $C_{12}$ polypropylene 304 g. (2 moles) dimethylbenzal, 10 ml. boron fluoride etherate and 168 g. (1 mole) of a commercial $C_{12}$ polypropylene fraction (consisting substantially of 1- and 2-ene 9 carbon chains with 2,4,6-methyl substituents) were heated at 60–75° C. for 3 hours, the catalyst neutralized with diethanolamine, and the reaction mixture distilled to give the partially demethoxylated adduct boiling at 148–154° C./4 mm., $N_D^{25}$ 1.4914.

*Analysis.*—Calc. for $C_{20}H_{32}O$: C, 83.26; H, 11.18. Found: C, 83.75; H, 11.05.

Example 15

112 g. (1 mole) of diisobutylene was added slowly to 348 g. (2 moles) dibutyl acetal and 8 ml. $BF_3$-ether complex. After the solution was kept at room temperature for 20 hours, the catalyst was precipitated from the solution.

Distillation gave 14 g. of a product boiling at 84–87° C. at 8 mm. pressure, $N_D^{25}$ 1.4264–1.4290.

*Analysis.*—Calc. for $C_{14}H_{28}O$: C, 79.17; H, 13.29. Found: C, 78.76; H, 13.33.

The reaction may be formulated as follows:

$$CH_3CH(OC_4H_9)_2 + CH_3-C(CH_3)-CH_2-C(CH_3)=CH_2 \longrightarrow$$

$$CH_3-C(CH_3)(CH_3)-CH_2-C(OC_4H_9)-CH_2-CH(OC_4H_9)-CH_3 \longrightarrow$$

$$CH_3-C(CH_3)(CH_3)-CH=C(CH_3)-CH_2-CH(OC_4H_9)-CH_3$$

2,2,4-trimethyl-6-butoxy-heptene-3

Example 16

12 ml. of $BF_3$-ether complex was added to 270 g. (3 moles) of dimethyl acetal with stirring.

To this solution was added 168 g. (1.5 moles) of diisobutylene with stirring. After the reaction mixture was heated and stirred at 50–55° C. for 4 hours, it was cooled and the catalyst was inactivated by addition of diethanolamine. Distillation gave 35 g. of an unsaturated product boiling at 84° C./30 mm., $N_D^{25}$ 1.4276–1.4283.

Analysis.—Calc. for C₁₁H₂₂O: C, 77.57; H, 13.02. Found: C, 77.50; H, 13.23.

*Example 17*

224 g. (2 moles) of diisobutylene was added dropwise to 304 g. (4 moles) of dimethyl formal and 16 ml. of BF₃-ether complex. After the reaction mixture was maintained at 20–25° C. for 18 hours, the catalyst was inactivated. Distillation yielded 11 g. of a product boiling at 78–82° C./31 mm. pressure, N$_D^{25}$ 1.4283–1.4290.

Analysis.—Calc. for C₁₀H₂₀O: C, 75.87; H, 12.90. Found: C, 77.03; H, 12.97.

*Example 18*

112 g. (1 mole) of diisobutylene was added slowly to 340 g. (2 moles) of dimethyl benzal and 8 ml. BF₃-ether complex. After the reaction mixture was kept at 25–35° C. for 7 hours, the catalyst was removed. On distillation, 40 g. of a product boiling at 85–88° C./2.5 mm. was obtained.

Analysis.—Calc. for C₁₆H₂₄O: C, 82.70; H, 10.41. Found: C, 82.64; H, 10.48.

The same product was obtained in larger yields when the reaction mixture was maintained at 55–60° for 5 hours.

The processes as described hereinbefore may be modified and/or adjusted as appears hereinafter.

As examples of hydrocarbons containing an ethylenically unsaturated group which may be employed in practicing the present invention may be mentioned isobutylene, diisobutylene, triisobutylene, polypropylene, polybutylene, styrene and the like. Thus, the term "hydrocarbon containing an activated ethylenically unsaturated group" as employed herein and in the appended claims is intended to denote the foregoing compounds and similar compounds operative in the present invention in which a carbon atom of said group is joined to two saturated hydrocarbon radicals in branched chain relationship or said group is in conjugated relationship with a benzenoid group. Compounds such as ethylene, propylene, cyclohexene and the like which do not contain such a branched chain or conjugated configuration have been found to be insufficiently active to undergo the desired addition reaction.

Formals, acetals, ketals and sulfur analogs thereof other than those described hereinbefore may be employed in practicing the present invention. Thus, there may also be mentioned, by way of example only, the following compounds: diethyl butyral, cyclohexanone diethyl acetal, diethyl ketal, dimethyl propional, dimethyl isobutyral, dimethyl acetal of lauraldehyde, dimethyl acetal of stearaldehyde, cyclohexanone dimethyl acetal, acetone dimethyl acetal, methyl ethyl ketone dimethyl acetal, phenyl acetaldehyde dimethyl acetal, acetophenone dimethyl acetal, the corresponding sulfur analogs of the aforementioned compounds, and the corresponding diethyl, dipropyl, propyl, dibutyl and other di-alkyl or mixed alkyl, for instance methyl ethyl, acetals and the like. It will, of course, be understood that acetals and similar compounds as aforementioned substituted by inert radicals which do not interfere with the production of the desired products in the desired reaction are to be included within the scope of the invention and claims.

In general, boron fluoride and its complexes with ether are to be preferred as the catalyst. However, other similar acid-reacting catalyst may be employed, such as boron trichloride, stannic chloride, gallium trichloride, titanium chloride, p-toluene sulfonic acid, sulfuric acid and the like. Aluminum halides could be used but may not be soluble to a sufficient degree, or may lead to undesirable side reactions such as dealcoholization, etc. The amount of catalyst is not highly critical, and generally from 0.5 to 5 mole percent based on the acetal is adequate.

The reaction is conducted under substantially anhydrous conditions, and diluents may be employed, although there is no particular advantage inherent in the use of a diluent. The temperature may range from about 0° C. to 100° C. or the boiling point of the acetal, depending upon the reactants, reacting conditions, catalyst, and the like. Pressure may be useful in some cases to keep reactants, such as gaseous olefins and the like, in the reactor and/or in liquid phase. Obviously, the reaction involves equimolar amounts of the reactants, but it is desirable in some instances to use an excess of the acetal, often in the ratio of 2 or 3 to 1.

After the reaction has been completed, the catalyst may be neutralized with any base or alkali, although the use of strong alkalies must be controlled to avoid degradation of the product. Preferably, anhydrous solvent-soluble bases of the type of triethanolamine, diethanolamine, ethanolamine, sodium methylate, ammonia, pyridine, and the like should be employed.

The reaction products are generally useful as chemical intermediates, as solvents, plasticizers, anti-dusting agents for dyestuffs, pesticides, soap powders, etc., where their stability and bland odors make them particularly useful, and as stabilizers for certain plastics, more particularly polyvinyl and polyvinylidene chloride polymers.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A process of preparing diethers of glycols in which the hydroxyl groups are attached to two consecutive alternate carbon atoms in a carbon chain comprising reacting equimolar amounts of a member of the group consisting of styrene, isobutylene, polybutylenes and polypropylenes, and a member of the group consisting of formals, acetals, ketals and sulfur analogs thereof under substantially anhydrous conditions in the presence of an acid-reacting condensing agent selected from the group consisting of boron fluoride, boron trichloride, stannic chloride, gallium trichloride, titanium chloride, p-toluene sulfonic acid and sulfuric acid.

2. The product of the process of claim 1.

3. The process of claim 1 in which the condensing agent is boron fluoride etherate.

4. A process comprising reacting equimolar amounts of styrene and dimethyl formal under anhydrous conditions in the presence of boron fluoride etherate.

5. A process comprising reacting equimolar amounts of diisobutylene and dibutyl acetal under anhydrous conditions in the presence of boron fluoride etherate.

6. A process comprising reacting equimolar amounts of isobutylene and dimethyl acetal under anhydrous conditions in the presence of boron fluoride etherate.

7. A process comprising reacting equimolar amounts of isobutylene and dimethyl benzal under anhydrous conditions in the presence of boron fluoride etherate.

8. A process comprising reacting equimolar amounts of styrene and diethyl mercaptal under anhydrous conditions in the presence of boron fluoride etherate.

References Cited in the file of this patent

UNITED STATES PATENTS

| Number | Name | Date |
| --- | --- | --- |
| 2,395,292 | Peterson et al. | Feb. 19, 1946 |
| 2,524,777 | Dermer et al. | Oct. 10, 1950 |
| 2,524,778 | Dermer et al. | Oct. 10, 1950 |
| 2,564,760 | Hoaglin et al. | Aug. 21, 1951 |
| 2,564,761 | Hoaglin et al. | Aug. 21, 1951 |

OTHER REFERENCES

Straus et al: Chem. Abst. Vol. 8 (1914) pgs. 332–333.

Paul et al.: Bull. Soc. Chim. France (Feb. 1951) pgs. 125–129.